United States Patent
Levitt et al.

(10) Patent No.: US 10,621,643 B2
(45) Date of Patent: Apr. 14, 2020

(54) SYSTEMS AND METHODS FOR DIGITAL GIFT CARD SELECTION

(71) Applicant: Gyft, Inc., Palo Alto, CA (US)

(72) Inventors: Mark Levitt, Sunset Beach (ZA); Vinodan Karthikeya Lingham, Palo Alto, CA (US); Clifford James MacDonald, San Francisco, CA (US); James George McMillan, Vredehoek (ZA); Michael Paul Brewer, Bellville (ZA); Margaret Grobler, Hout Bay (ZA); Michael Jonathan Gaylord, Hout Bay (ZA)

(73) Assignee: Gift Solutions LLC, Omaha, NE (US)

( * ) Notice: Subject to any disclaimer, the term of this patent is extended or adjusted under 35 U.S.C. 154(b) by 0 days.

(21) Appl. No.: 14/798,075

(22) Filed: Jul. 13, 2015

(65) Prior Publication Data

US 2016/0042434 A1 Feb. 11, 2016

Related U.S. Application Data

(63) Continuation of application No. 13/831,365, filed on Mar. 14, 2013, now Pat. No. 9,117,237.
(Continued)

(51) Int. Cl.
   *G06Q 30/06* (2012.01)
   *G07F 17/32* (2006.01)
   *G06Q 30/02* (2012.01)

(52) U.S. Cl.
   CPC ......... *G06Q 30/0631* (2013.01); *G06Q 30/02* (2013.01); *G06Q 30/0633* (2013.01); *G06Q 30/0641* (2013.01); *G07F 17/329* (2013.01)

(58) Field of Classification Search
   CPC .. G06Q 30/0631; G06Q 30/02; G06Q 30/641; G07F 17/329
   See application file for complete search history.

(56) References Cited

U.S. PATENT DOCUMENTS 6,360,254 B1 * 3/2002 Linden .............. G06F 17/30876
   707/E17.112
7,580,861 B1 * 8/2009 Song .................. G06Q 30/0253
   705/14.51
(Continued)

FOREIGN PATENT DOCUMENTS

JP 2002-312645 A 10/2002
JP 2004-265364 A 9/2004
(Continued)

OTHER PUBLICATIONS

Anonymous, send.com Redefines Gift Giving Online, Nov. 8, 1999, PR Newswire, p. 2. (Year: 1999).*
(Continued)

*Primary Examiner* — Jason B Dunham
*Assistant Examiner* — Brittany E Bargeon
(74) *Attorney, Agent, or Firm* — Eversheds Sutherland (US) LLP

(57) ABSTRACT

Various of the disclosed embodiments generally contemplate computer-implemented systems and methods for selecting an electronic or virtual gift card from among a plurality of possible gift cards or gift card issuers. Various of the embodiments may match and rank the gift cards according to a gift card recipient's characteristics, and possibly to the electronic or virtual gift card itself. Certain embodiments also contemplate the selection of physical gift cards selection, matching, and ranking aspects of the invention. Various methods for operating a gift card business using certain of the embodiments are also disclosed.

7 Claims, 14 Drawing Sheets

Related U.S. Application Data

(60) Provisional application No. 61/658,855, filed on Jun. 12, 2012.

(56) References Cited

U.S. PATENT DOCUMENTS

| | | | |
|---|---|---|---|
| 2005/0119947 A1* | 6/2005 | Lin | G06Q 30/02 |
| | | | 705/26.8 |
| 2008/0235095 A1 | 9/2008 | Oles et al. | |
| 2008/0301000 A1* | 12/2008 | Roch | G06F 15/16 |
| | | | 705/26.8 |
| 2009/0164334 A1* | 6/2009 | Schmidt | G06Q 30/0601 |
| | | | 705/26.1 |
| 2009/0192928 A1* | 7/2009 | Abifaker | G06Q 30/02 |
| | | | 705/35 |
| 2010/0169160 A1* | 7/2010 | Wu | G06Q 30/02 |
| | | | 705/14.4 |
| 2010/0280879 A1* | 11/2010 | O'Sullivan | G06Q 30/02 |
| | | | 705/14.19 |
| 2010/0299194 A1* | 11/2010 | Snyder | G06Q 20/10 |
| | | | 705/14.13 |
| 2012/0185330 A1* | 7/2012 | Kleinrock | G06Q 30/02 |
| | | | 705/14.49 |
| 2012/0197750 A1* | 8/2012 | Batra | G06F 17/30592 |
| | | | 705/26.7 |
| 2012/0245987 A1* | 9/2012 | Isaacson | G06Q 30/02 |
| | | | 705/14.23 |
| 2012/0278127 A1* | 11/2012 | Kirakosyan | G06Q 30/0631 |
| | | | 705/7.29 |
| 2013/0103542 A1* | 4/2013 | Abuelsaad | G06Q 30/0631 |
| | | | 705/26.41 |
| 2014/0351015 A1* | 11/2014 | Ehn | G06Q 30/02 |
| | | | 705/7.31 |

FOREIGN PATENT DOCUMENTS

| | | |
|---|---|---|
| JP | 2013-521573 A | 6/2013 |
| JP | 2013-541082 A | 11/2013 |
| WO | 2011/112369 A1 | 9/2011 |
| WO | 2012/030400 A1 | 3/2012 |

OTHER PUBLICATIONS

Extended European Search Report dated Dec. 17, 2015 for Application No. EP13805210.5-1958, Munich, Germany, pp. 1-6.
Office Action issued in Japanese Patent Application No. 2005-517408, dated Aug. 1, 2017, 11 pages.

* cited by examiner

SYSTEMS AND METHODS FOR DIGITAL GIFT CARD SELECTION

CROSS-REFERENCE TO RELATED APPLICATIONS

This application claims priority to the U.S. Provisional Application No. 61/658,855, entitled "System Method and Service for Issuing Mobile Gift Card and for Matching Gift Card Merchant to Recipient," filed on Jun. 12, 2012, and is a continuation of and claims the benefit of U.S. Non-provisional patent application Ser. No. 13/831,365 entitled "System, Method, and Medium for Digital Gift Card Selection" filed on Mar. 14, 2013. The entire contents of both applications are hereby incorporated by reference in their entirety.

FIELD OF THE INVENTION

Various of the disclosed embodiments concern electronic or virtual gift card systems.

BACKGROUND

The Internet has provided a plethora of opportunities to discover and learn about a remarkable range of goods and services. Unfortunately, the very diversity offered by the Internet may make it difficult to identify items most relevant to a particular user's needs. This may be particularly true for gift cards, which often relate to the unique personal circumstances not only of the purchaser but of the individual or individuals for whom the cards are purchased. Accordingly, there exists a need for systems and methods which facilitate efficient and effective selection of gift cards from a variety of vendors.

SUMMARY

Certain embodiments contemplate a method for presenting a user with a selection of gift cards comprising: receiving an identification of an intended recipient of a gift card; determining a list of gift cards based on the intended recipient; ranking the list of gift cards based on the intended recipient; and presenting the list of gift cards to the user based on the ranking.

In some embodiments, determining the list of gift cards comprises determining a distinct value associated with each of a plurality of gift cards by weighting a plurality of attributes of each of the plurality of gift cards and selecting, as the list of gift cards, cards from the plurality of cards whose associated value exceeds a threshold. In some embodiments, the plurality of attributes includes a correspondence between merchandise associated with a gift card and a preference of the recipient. In some embodiments, the plurality of attributes includes a location of a merchant. In some embodiments, the plurality of attributes includes trending information associated with merchandise or a service, the merchandise or the service associated with a gift card. In some embodiments, determining a list of gift cards based on the intended recipient comprises determining that information concerning the recipient is not present in a database and selecting a plurality of gift cards based on trending information as the list of gift cards, and wherein ranking the list of gift cards based on the intended recipient comprises ranking the list of gift cards based on the trending information. In some embodiments, the trending information comprises gift card redemption data associated with various merchandise.

Certain embodiments contemplate a method for redeeming a gift card using a mobile device comprising: displaying a region of foil on the mobile device; receiving an input from a user; revealing at least a portion of an indicator based on the input from the user; and indicating to a server that the gift card has been redeemed based on the user input.

In some embodiments, indicating to a server that the gift card has been redeemed based on the user input comprises determining that a percentage of the region of foil is no longer displayed. In some embodiments, the input is one of a finger tap, finger touch, or finger swipe. In some embodiments, the indicator comprises numerical characters. In some embodiments, the indicator comprises a barcode. In some embodiments, the gift card may be redeemed only once.

Certain embodiments contemplate a computer system for displaying a graphical user interface (GUI) for completion of a form by a user, the system comprising: a display; a processor; a communication port; a memory containing instructions, wherein the instructions are configured to cause the processor to: display a first input region on the display; receive a first input from the user; display a second input region on the display based on the receipt of the first input; receive a second input from the user; display a final input region on the display; receive a final input from the user; and transmit a field value associated with the first input and a field value associated with the second input, using the communication port, to a server, in response to the receipt of the final input from the user.

In some embodiments, the computer system is a mobile phone. In some embodiments, the second input region may be vertically offset from the first input region by a first amount and the final input region is vertically offset from the first input region by approximately twice the first amount. In some embodiments, the final input comprises selection of an action button. In some embodiments, the first input from the user comprises a store selection. In some embodiments, the second input from the user comprises a gift card cover selection.

Certain embodiments contemplate a computer system for presenting a user with a selection of gift cards comprising: means for receiving a means for identifying an intended recipient of a gift card; means for determining a list of gift cards based on the intended recipient; means for ranking the list of gift cards based on the intended recipient; and means for presenting the list of gift cards to the user based on the ranking.

In some embodiments, the computer system is a mobile phone. In some embodiments, the receiving means comprises one of a packet reception module, a WiFi receiver, a cellular network receiver, an Ethernet connection, a radio receiver, a local area connection, or an interface to a transportable memory storage device. In some embodiments, the identifying means comprises one of a social network ID, a first name, a user ID, a mailing address, or an email address. In some embodiments, the determining means and the ranking means comprise one of a software application running on a server or a software application running on a user device. In some embodiments, the presenting means comprises one of a display on a user device, or a network interface in communication with a user device.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
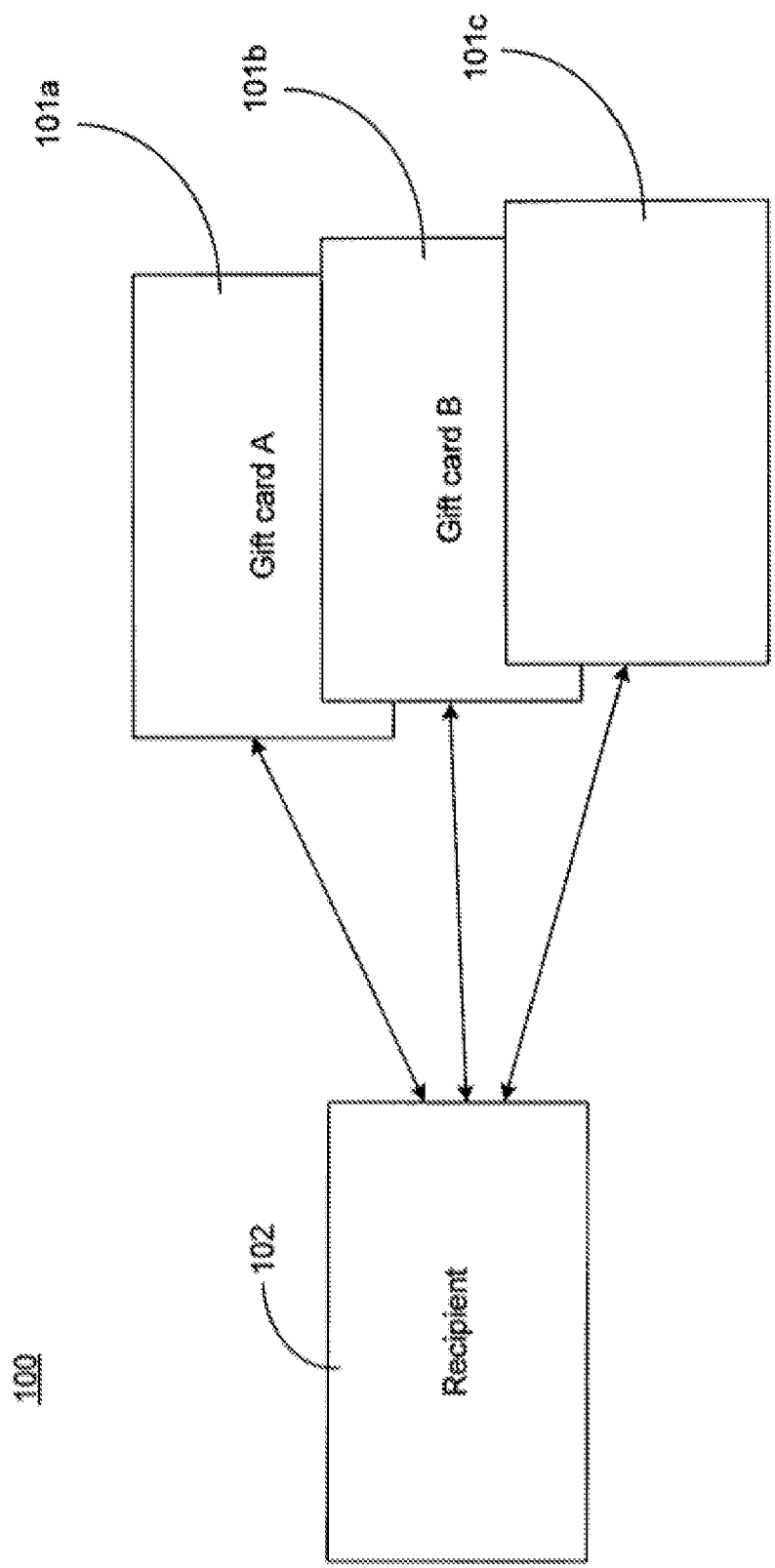
FIG. 1 illustrates a block diagram of a personal ranking of a large plurality of electronic or virtual gift cards, e.g., mobile gift cards, ranked according to a specific recipient.

The following description and drawings are illustrative and are not to be construed as limiting. Numerous specific details are described to provide a thorough understanding of the disclosure. However, in certain instances, well-known details are not described in order to avoid obscuring the description. References to one embodiment or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Overview

Certain of the disclosed embodiments provide systems, methods, business methods, and applications that manage aspects of gift cards. Certain of the embodiments may be implemented as a mobile application (such as on an Apple computer, smart phone, iPad, iPhone, Android based mobile platform, notebook computer, or the like) that manages all aspects of gift cards. In some embodiments, a method and service are implemented on an Internet based infrastructure having client side devices (for sender and recipient). Servers with accessible databases may also be used for storing information and executing computer software to perform various back office processing, matching and ranking, collecting statistics, trending data, and the like. In certain embodiments cellular telephones or mobile devices may utilize cellular data communications to communicate with the server. Certain embodiments may provide services using Internet or other network, wireless data, Wi-Fi, and other data links for communication and operation.

Gift Card Transmission

In certain embodiments, a user (sender or purchaser) may desire to send a gift card to a recipient using an electronic device (such as a smart phone, a computer, or the like communications device). The user may communicate with an external networked computer such as with a computer server and accessible database via an application program on their device, or via a network link without any installed application. The sender may identify the intended recipient and a monetary value for the gift card. The monetary value selected may optionally be modified by promotions, discounts, premiums, or the like. The sender may provide additional information about the recipient, such as demographic data or other data or information as described in greater detail herein. Certain embodiments then select and rank potential gift cards using a selection and matching procedure or algorithm. In some embodiments, a score or numerical match may optionally be provided in addition to a positional ranking, such as first, second, third, fourth rank, and so forth. Cards identified as relevant to a recipient may be presented as a total or partial order to the user based on the cards' associated rankings.

Certain embodiments may perform these operations in real-time or substantially in real-time. In certain of these embodiments the sender or purchaser may not be aware of any delay in providing the ranked gift cards. The sender or purchaser may then choose the gift card to purchase and send the gift card to the recipient. The user may not need to choose the highest ranked gift card and may for example use a list or scroll through various ranked cards before making the selection. The ranking may be presented to the user with the expectation that the user will select a gift card in accordance with the lifestyle, interests, and preferences of the recipient.

In some embodiments, once the gift card is selected and purchased, the gift card may be sent or communicated to the intended recipient from the computer server via a network. In some embodiments, the gift card may be sent to the recipient in the form of a uniquely identified token attached to or as part of a text, email, or in any other electronic form. The card may include a personal message from the sender. The system may provide some notification that the recipient has received the gift card. In some embodiments a reference to a virtual gift card may be included in the message, whereas in other embodiments the message may reference a method for redeeming a physical gift card. The user may be able to request a physical gift card when the recipient is known to lack a mobile or electronic device.

In some embodiments, the user may manage various gift card features, such as: storing plastic gift cards in a virtual application; purchasing gift cards; sending gift cards to contacts via the contacts' respective mobile phone numbers, email addresses, or social network addresses; redeeming your virtualized gift card in the physical or online store; other management of gift cards as described elsewhere in this description.

Large or Unlimited Number of Merchants

Rather than manage hundreds or a few thousand merchants, various of the disclosed embodiments may be designed to manage a large or unlimited number of merchants. In this manner, a large number of users and gift card redemptions may be managed by these embodiments. The gift cards may be redeemed in exchange for desired goods and services. Certain embodiments may operate a large data storage system and data base that stores a large amount of purchasing patterns across users of varying locations, demographics and interests. In some embodiments this may occur in real time or substantially in real time (e.g., fast enough that there is no perceptible delay in response to the user other than the time it takes for the communication to occur). In some embodiments the system may support real analytical services to calculate real time (or substantially real time) buying trends that will have commercial value to consumers of such information.

Gvft Gift Card Matching and Ranking

FIG. 1 illustrates a block diagram of a personal ranking of a large plurality of electronic or virtual gift cards, e.g., mobile gift cards, ranked according to a specific recipient. Certain embodiments contemplate ranking potential gift cards as a partial or total order using a ranking system. As illustrated in FIG. 1 the method may rank a plurality of cards 101a-c relative to an intended recipient 102.

The recipient 102 may possess a plurality of attributes within the system, (recipient profile's attributes or RPA). In some embodiments, these attributes may be constructed, for example, from a set or series of explicit and extrapolated interests from an individual's social profile. Personal interests may include: demographics, location, and data collected from various actions taken previously by the recipient. In some embodiments, extrapolated attributes may be selected from the popular trending interests of other recipients with similar demographics and locations.

Each gift card may advantageously have a profile that is constructed from a set or series of known attributes of the merchant and the merchant's goods and/or services. These attributes may be referred to herein as known attributes or as mobile gift card attributes (MGCA).

Figure 2:
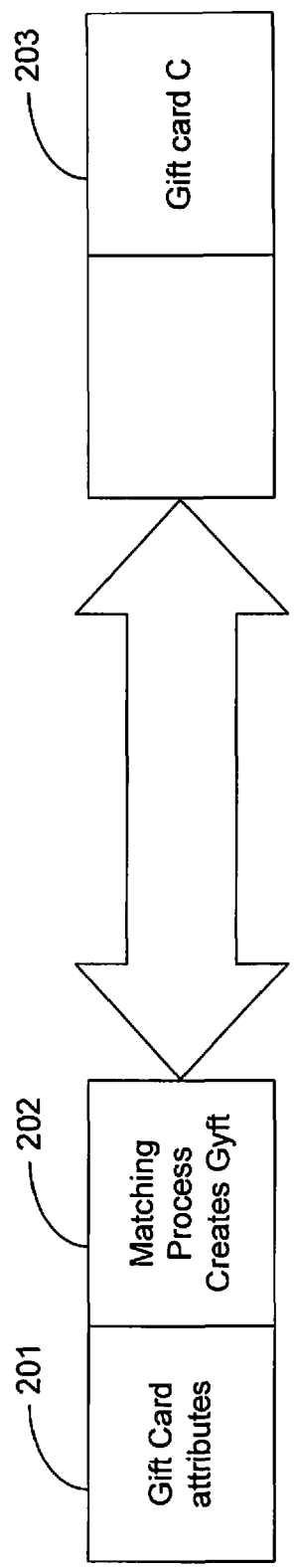
FIG. 2 illustrates a general block level diagram for matching a plurality of selected gift card attributes with a particular gift card.

Certain embodiments may match the recipient profile's attributes (RPA) with the mobile gift card attributes (MGCA) using a Matching Process to create a Rank Index. The Rank Index may serve as an indicator or measure of each gift card's significance to that user. FIG. 2 is a general block level diagram illustrating a method 202 for matching a plurality of selected gift card attributes 201 with a particular gift card 203. The matching process may use a computer program based algorithm executing on a processor of one or more computers and associated memory.

The innovative ranking allows the system to list the most appropriate cards higher up in the ranking which leads to higher conversion rates as users naturally choose the cards at the more highly ranked top of the list that are highly appropriate for them.

Features of Gift Card Approaches and Services

Unlike most tangible goods, a gift card may be associated with a merchant and imply that the gift card effectively represents a set of underlying products and services associated with the merchant. A user may have an affinity for a subset of the products or services presented by the merchant and so the personalization process of certain embodiments may produce a correspondence building upon the recipient's preferences.

Figure 3:
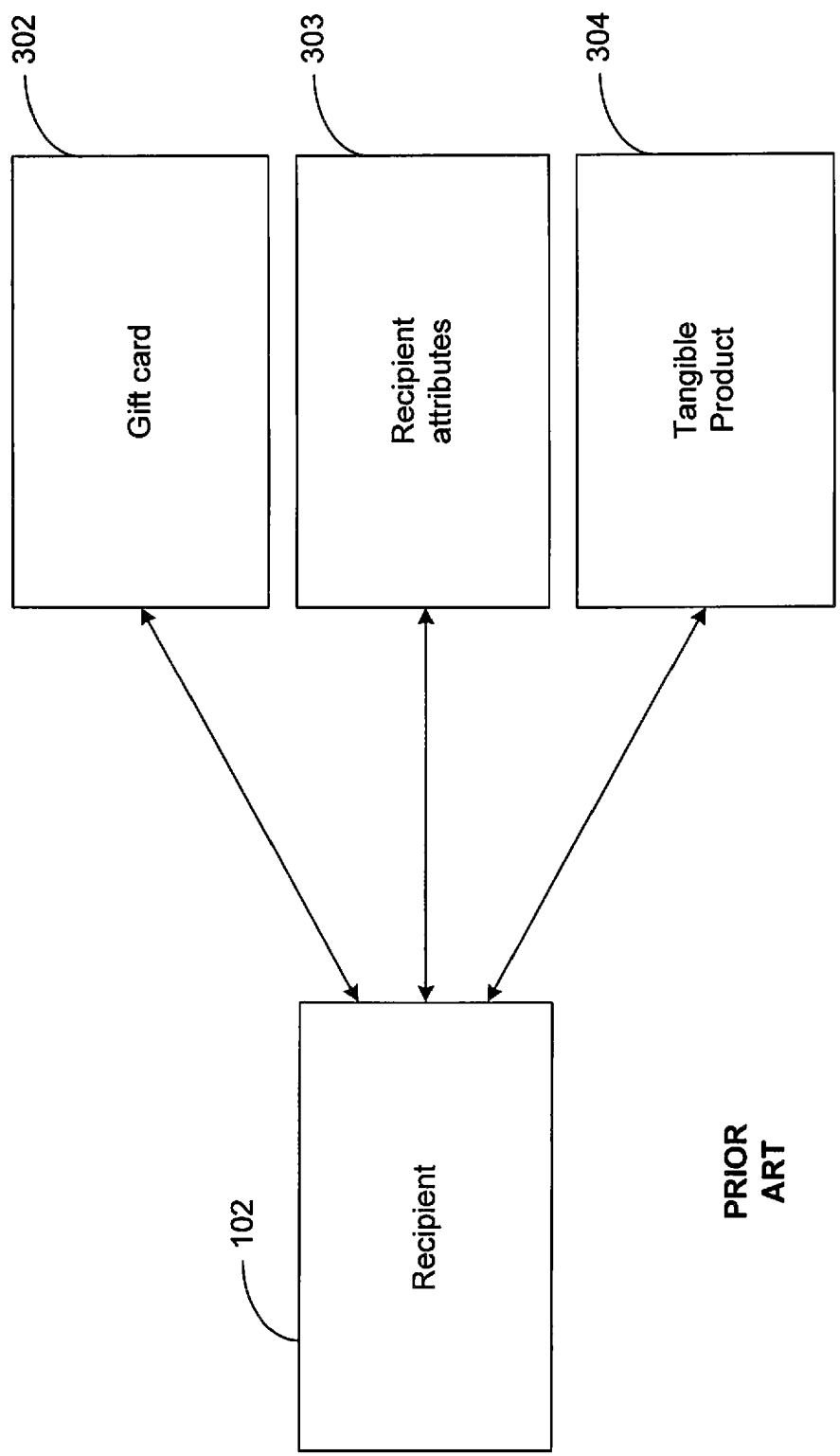
FIG. 3 illustrates a general block level diagram linking a user to a list of suggested products in a conventional system.
Figure 4:
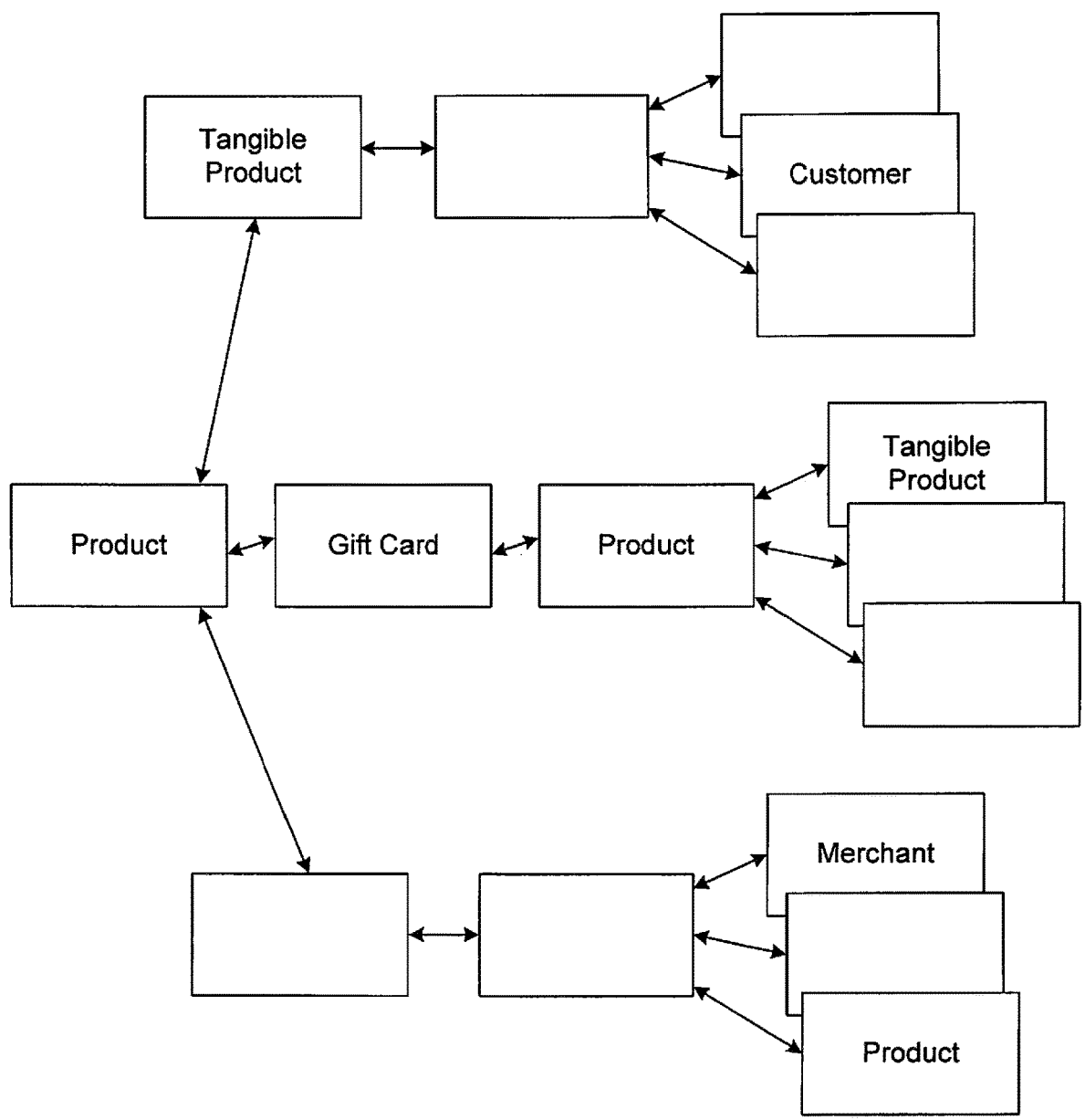
FIG. 4 illustrates a general block level diagram of an example of the innovative gift card-based personalization engine that links a user through the gift card and the associated merchant to a list of suggested products in certain embodiments.

FIG. 3 illustrates a general block level diagram linking a gift card 302, recipient 102, recipient attributes 303, and a list of suggested products 304 in a conventional system. FIG. 4 illustrates a general block level diagram of an example of the innovative gift card-based personalization engine that links a user through the gift card and the associated merchant to a list of suggested products in certain embodiments.

Gift Card Attributes

In some embodiments, most or even all of the recipient's attributes may be used, while in other implementations only a smaller set will be used. Furthermore, it may be appreciated that the attributes may change over time according to the information and data that are available regarding a recipient.

Certain embodiments include location identifiers with the gift cards. These location identifiers may indicate where a merchant is located and thereby locations where gift cards can be redeemed. If the purchase or redemption is to be made electronically, such as over the Internet, the location identifier may instead indicate where the merchant is willing or able to receive a redemption and/or to ship the purchased item or service. Other card attributes may include: Country; State; City; Store geo-location addresses (or other location information).

Certain embodiments contemplate elements for merchants, which may be used to help identify the merchant associated with the goods. For example, merchant elements may include: the brand essence of the merchant (e.g., Footlocker="shoes"); product categories, such as "running shoes"; brand names, such as "Apple"; inventory items, such as "Kindle Fire"; and merchant-provided demographic statistical attributes.

In some embodiments, the merchant may provide a series of demographic breakdowns of the user base, for example: gender mix: male 80%; female 20%. Demographics may include gender, age, occupation, income, education, marital status, and/or other demographic information.

In some embodiments, merchants may provide interest keywords. These keywords may indicate interests that may be connected to gift cards' merchant's products. For example, a merchant offering parachute paraphernalia could offer keywords such as "Extreme Sports".

Recipient Attributes

In some embodiments, the recipient's attributes may include demographics such as: age; gender; location; religion; number of children; income; education; recipient prior history with the system; site behavior, interests stipulated by the recipient; search history (where the recipient searched on product, brand, store, etc.); previous card purchases by others on behalf of the recipient (third parties may provide the system with data on their associates' patterns or their profile may be populated upon signing up with the system). In some embodiments the system may capture the metadata associated with another card where the recipient previously redeemed or topped up the card. Some embodiments may also consider social network indicators (such as Facebook, Google+, etc.). From social interactions, the system may identify items liked, items already owned, or items wanted by the user.

In some embodiments, key celebrations related to a user may indicate an interest in typical items associated with each form of celebration: birthdays; relationship status changes; weddings; baby showers; religious holidays; etc. Some embodiments may use Artificial Intelligence (AI) and/or Machine Learning techniques and mechanisms to generate keywords based on what one's interests appear to be.

Matching Process Operation

The matching process may refer to search data, e.g. from merchants or the card system. A searchable database may be based on the available cards available, what products the cards can buy, where the products are available, and the like. Certain embodiments may consider the combination of the merchant's product mix and who the merchant's target client is (demographics, likes, location, age, etc.).

Certain embodiments may match cards to recipients based on the search criteria provided by a user and based on search data from the database. Embodiments may combine these two elements with Artificial Intelligence, Machine Learning or similar techniques may be used to improve the appropriateness of the match. Filtered results may have additional sorting based on price saving, and search criteria, or even paid-for featured cards.

Certain embodiments may also consider matching based on current trends that are generally becoming popular, or are popular within an area and/or amongst a certain demographic, such as a demographic associated with the recipient or with the user.

Various of the above operations disclosed herein may be performed in real time (or substantially real time). In this case, e.g., if a user wants to decide which card to buy for a friend the system may have little knowledge about that friend. In this situation, certain embodiments construct a profile in real-time using the algorithm and may make those suggestions in microseconds (real time or substantially real time so that there is little perceptible delay during the process).

Merchant Targeting of Users with Specified Attributes

Rather than match users to criterion on an all-or-nothing, binary, basis, various of the disclosed embodiments do not exclude users based on a binary logic mechanism. Instead the system may rank users using a weighting mechanism with different weights and multiple weighting factors. These factors may be different than the binary "0" (no) or "1" (yes) or equivalent. Certain embodiments may apply this approach to massive data sets in real time using a continuously evolving weighting process.

Artificial Intelligence systems, including at least some of the following mechanisms may be employed in certain embodiments to manage the complexity of the real time weightings: Bayesian networks; neural networks; machine learning; genetically evolving algorithms; etc.

Granular Matching Techniques

Certain embodiments may employ clear binary matching attributes such as gender, age, and location. These attributes may make it very easy to create exclusivity in gift cards that can be shown to specific users. Subtle information may not be easily utilized in such binary approaches, e.g. the customer may like an article on running shoes, which may suggest that the customer likes shoes in general, but a closer analysis shows that the customer prefers sporting goods. Accordingly, certain embodiments attempt to leverage distinctions that are multi-faceted or shades of gray during the matching process. These fuzzy distinctions are really shades of gray which lend themselves to various forms of artificial intelligence, e.g., as weighted inputs to a decision or classification system.

Aggregation of Merchant Aggregators and Merchants

Certain gift card providers may integrate directly into an aggregator in order to manage a number of their customers. Certain embodiments provide an architecture that allows the backend to integrate into and interoperate with a multitude of gift card aggregators. Some of these aggregators may offer better terms than others. These terms are likely to be differing revenue shares, as well as additional value.

As an example, suppose a user wishes to buy a 'Target' gift card—but the request discovers that three of five gift card aggregators return the same gift card. To determine which cards to present to a user, certain embodiments carefully examine the revenue-earning opportunity of each card or special arrangements with the merchants via the aggregator, or differing revenue sharing arrangements with each aggregator. These embodiments may find the aggregator that provides the best revenue generating deal for that specific card. In that case, the proposed system method may choose that most lucrative option.

Trending

Certain search engines, such as Google, may discover some types of real-time trends that emerge when many users search for similar items at a specific time. This may allow the engine to understand that users in different locations are seeking certain products. The search engine may infer the purchasing patterns of customers through the simple act of searching using keywords.

Certain embodiments contemplate identification of trending through a process of redemption of the gift card for goods, with integration into the point of sale. By maintaining a record of the inventory items of the gift card recipient and the amount of money spent per gift card, analytics may be used to indicate the popularity of certain merchants. By filtering the data sets on known demographics, interests and locations of the user it may be possible to create a massive evolving dataset of trends that would be searchable in real time.

Such a searchable database may be of enormous value to the merchants. Furthermore, by creating an Application Program Interface (API) that is available to third parties, third parties may monitor real time yield management systems to dynamically alter their pricing of products in their stores to match the fluid flow of demand metrics, such as gift card demand metrics, to their own supply chain systems. Non-real time analytics may also or optionally be employed in some embodiments. Thus, while the trending information may be a very valuable service to third parties, trends are also very valuable internally, in that they can be used by the ranking and matching algorithm.

Trending—Default or Initial Values and Parameters

Certain embodiments of the ranking and matching service may anticipate situations where little is known about a recipient. When little is known about the recipient, or if the recipient is totally unknown to the system, the system may instead rely upon trending. Trending may be used to give starting indexes based purely (or even partially) on their general popularity across the entire system. For each additional piece of information available about the recipient the system may apply filtering processes on the trending information. For example, if the system has information that can identify some demographic information such as the gender, geographic location or region and age of a recipient, it can apply the trends for people of that demographic. Certain embodiments also apply more subtle attributes, such as users who liked some particular item or event, such as for example the Lady Gaga fan page. While the use of trending data may be useful as an initial or default value or set of parameters it may be appreciated that other or different default or initial values or parameters may be utilized.

Splitting Monetary Value from an Existing Gift Card to a New Gift Card

In some embodiments, the value on a gift card may be split or divided into multiple gift cards which could be re-gifted to others. This may be done through the creation of a new gift card with some specified value, even a zero value, into which some of the value of the initial card is transferred. Creating a new zero value card and then adding value to it may be advantageous in some instances as a gift card creation and accounting administrative tool.

Promoting the Spending and Conversion of Gift Cards

Merchants may generally prefer that the holders of gift cards actually spend the value in a store or online. In this way the customer engages with the brand and is likely to spend more at the moment of redemption, as well as being likely to keep the brand at the top of their mind for the future, further enriching the brand.

In order to promote spending on the existing gift card certain embodiments contemplate including certain triggers that will lead to communications via in-application, email, SMS, text message, Facebook, other social media or other channels. Some examples of triggers without limitation may be: On Father's day, Christmas, or any other celebration day, the system, method, or application component can broadcast broad messages to everyone to buy gifts on that basis; On a gift card holder's friends' birthday, the system, method, or application component may be able to send the gift card holder a message to go and buy their friend a gift.

Gift Registries

In some embodiments, users can create a virtual gift card registry, associated with one or more gift cards—where for example their family, friends, or other persons can contribute to putting in value into one or more of the cards. The user can trigger alerts to their friends or others through various communication channels to contribute. In some embodiments, charities can create a card registry that is used to encourage people to send a card to their charity or even to create a list of children or adults who are promoted as individual recipients of cards.

Merchant Management

Certain embodiments allow a backend processing system for merchants to set up their own gift cards and allow them to create their own proprietary or branded gift card program. This allows the merchants to subsequently market their own card program via multiple channels, e.g., as a badge on a website; as widgets for websites; as printed stickers and flyers in which unique or general codes (e.g., barcodes or QR codes) are offered to collect gift cards on a mobile device; etc.

Redemption Process of Free Cards Provided Through the Merchant Management System In some embodiments, a merchant can (optionally) send an SMS or other text or communication with a number to a redemption ShortCode. The ShortCode may be used to perform a redemption on the system provider or administrator end. The system provider inventory may then mark this particular card as redeemed (or partially redeemed—and may, for example, create a new card with any remaining unredeemed value).

The External Application Program Interface (API)

Along with vendor management, Application Programming Interfaces (APIs) and Graphical User Interfaces (GUIs) may advantageously be established and provided for certain vendors to prepare programs taking advantage of the system infrastructure. This may give a vendor the freedom to integrate the card process into its own system and to manage and have greater control over its gift card programs.

Progressively Growing Accordion-Type Forms

Figure 5:
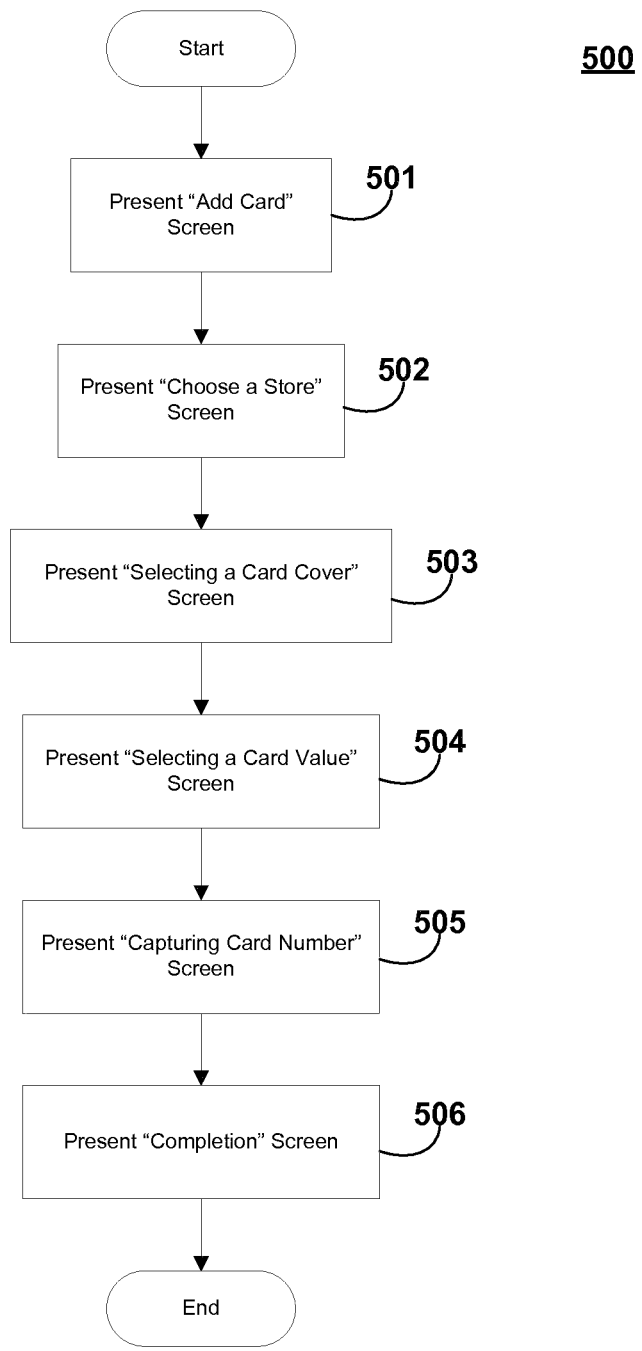
FIG. 5 illustrates a general process flow diagram for receiving a gift card selection through an accordion graphical user interface (GUI) system in certain embodiments.

With reference to FIG. 5, and to FIGS. 6-11 which show additional detail, there is shown an accordion graphical user interface and related method. Making use of animations and transitions, in these embodiments the system may gradually reveal fields of a form in a mobile application. At first only the first form field may be visible. As the user finishes entering data into the form field, the "accordion" grows down to reveal the second field, then the third, and so forth. After the last field is filled in, the action button appears to 'send' the form (e.g., as a POST or GET request in FITML). The user may have the ability to go back to previous fields whenever he/she needs to, e.g. by selecting a preceding field in the accordion display. In addition to the growing accordion, the system may try, as far as possible, to provide a plurality of options for the user to choose from to fill the form by using tap-to-select rather than typing out words on their mobile device. A list of options can appear (per form field), which may maximize the accordion to full-size. After selecting the chosen option, the accordion may shrink back to its previous size and open the next field (e.g. growing down to reveal the next field).

Figure 6:
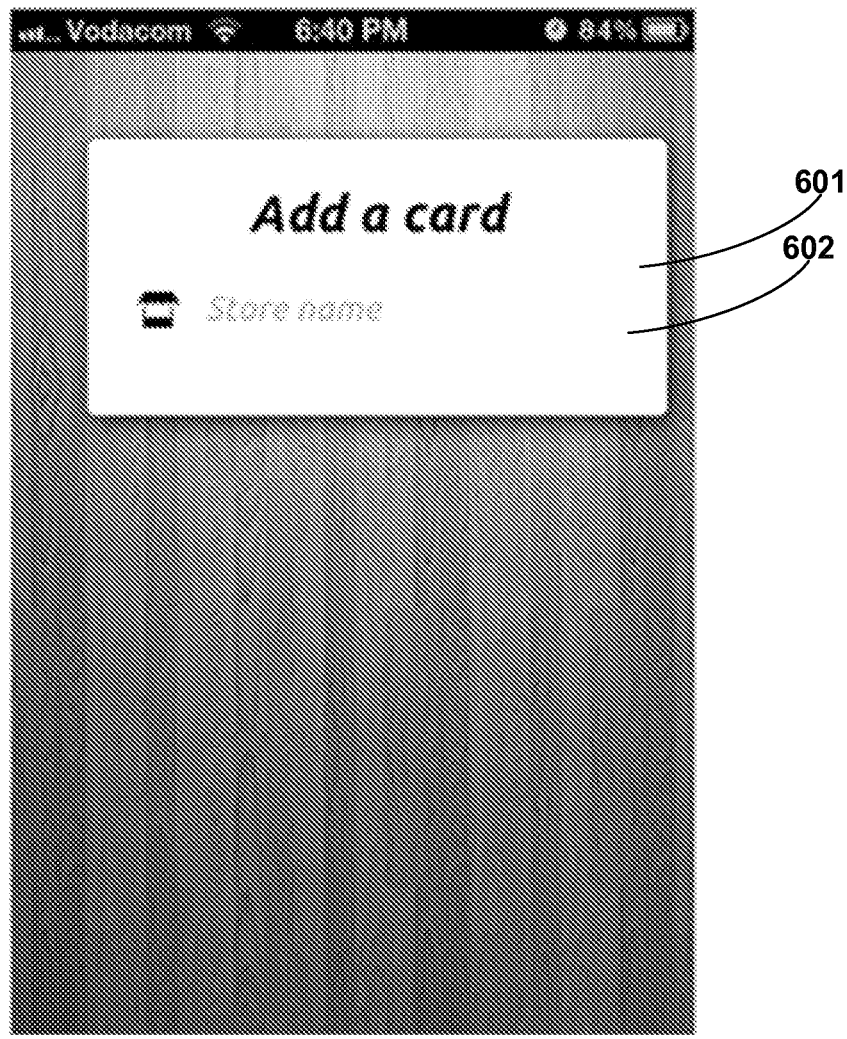
FIG. 6 is a screenshot of an "Add a Card" screen presented to a user of the accordion interface in certain embodiments.

With reference to FIG. 5, the process 500, at step 501 may first present the user with an "Add card" screen as depicted in FIG. 6. An animation may be used to open the screen, possibly by having a white box slide up from the bottom of the screen. In some embodiments, the system may automatically transition to the next screen from this initial screen without user input. The system may automatically transition from other screens once the user has completed providing input for a field.

Figure 7:
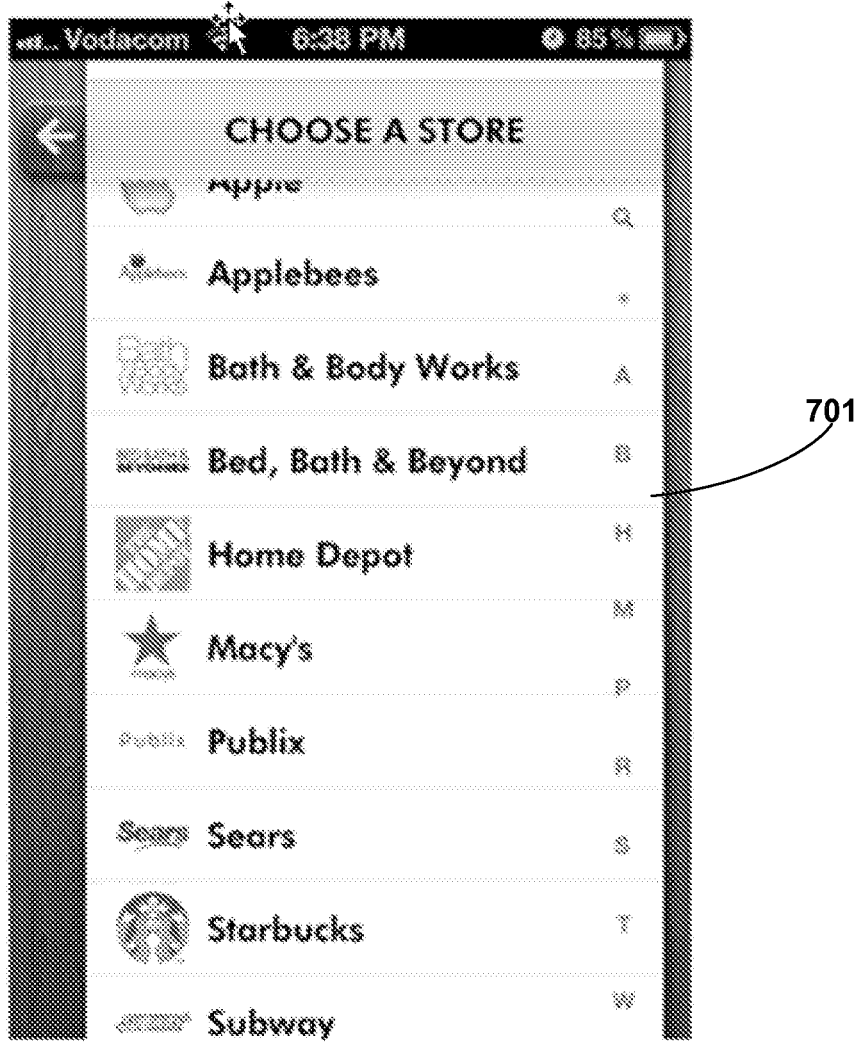
FIG. 7 is a screenshot of a "Choose a Store" screen presented to a user of the accordion interface in certain embodiments.

At step 502, the system may present the user with a "Choose a Store" screen as depicted in FIG. 7. In the accordion view, an initial box 601, shown in FIG. 6, may depict successively completed entries as form values are completed. For example, initially a "store name" field 602 is indicated without a name. Upon selecting the "store name" field 602, the user may be presented with the list of store names 701, shown in FIG. 7. Following the selection of a store, e.g., "Bath and Body Works", the system may populate the field 602 with an image or with text to indicate that a selection has been made. Pursuant to the accordion paradigm, the field 602 may represent a single stage in the "accordion" with each stage indicating a successive input for data entry into a form, such as an HTML form.

In some embodiments, each element in the list may be offset from its preceding element by a fixed amount and may only appear following a completed entry in the preceding element. The user may select elements in the store list 701 with a tap, touch, or other tactile indication and may scroll between stores. Upon making a selection, the selection list may collapse into an indication of the selection and the system may proceed automatically to step 503.

Figure 8:
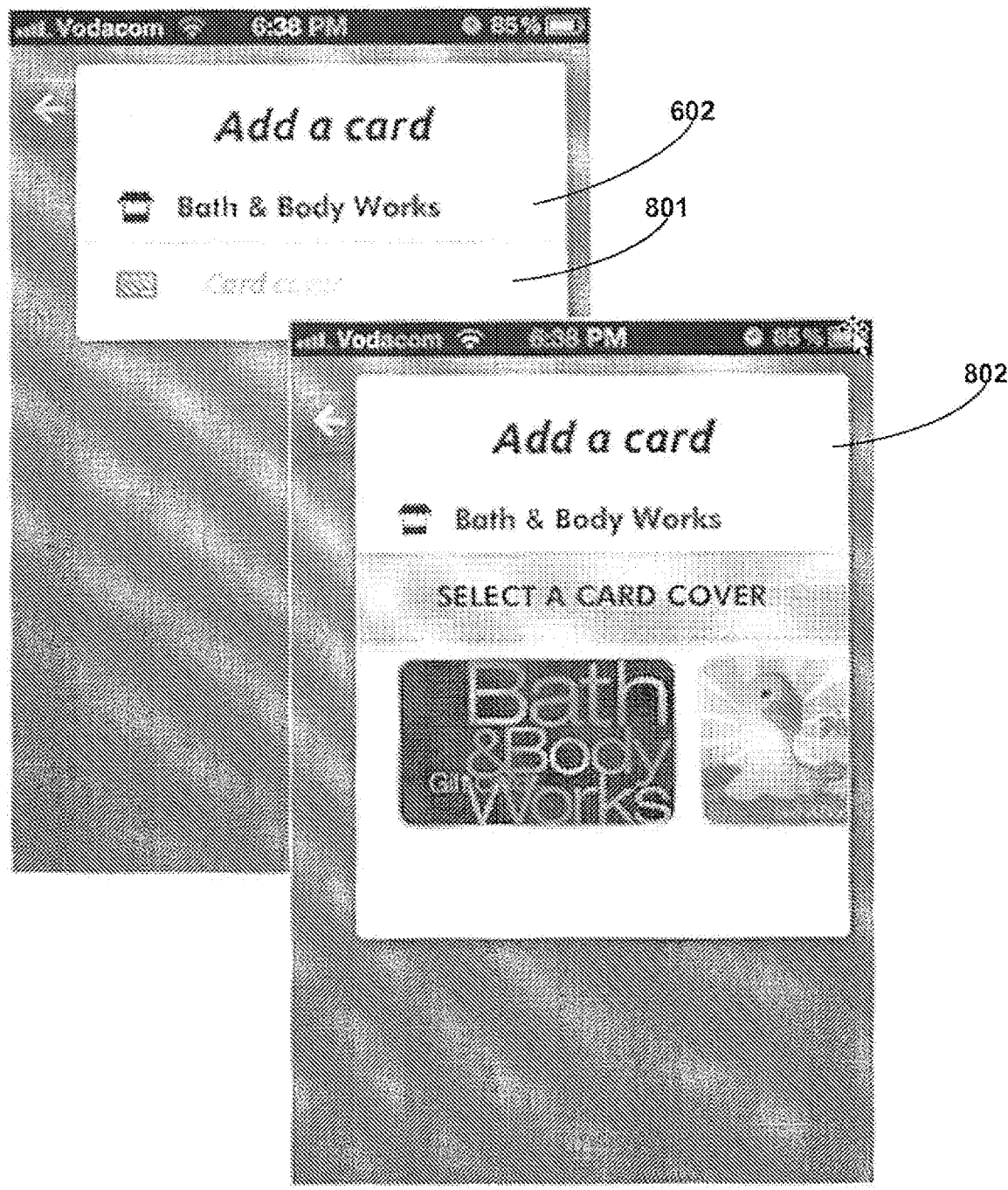
FIG. 8 is a screenshot of a "Selecting a Card Cover" screen presented to a user of the accordion interface in certain embodiments.

At step 503, the system may present the user with a "Selecting a Card Cover" screen as depicted in FIG. 8. As mentioned, the accordion view may have populated the field 602 and may now present the user with a new "card cover" field 801 adjacent and below. Selection of this field may initiate the card selection process screen 802. Following a selection, the screen 802 may collapse, the accordion stage for "card cover" may be populated, and the next entry for selecting a card value presented.

Figure 9:
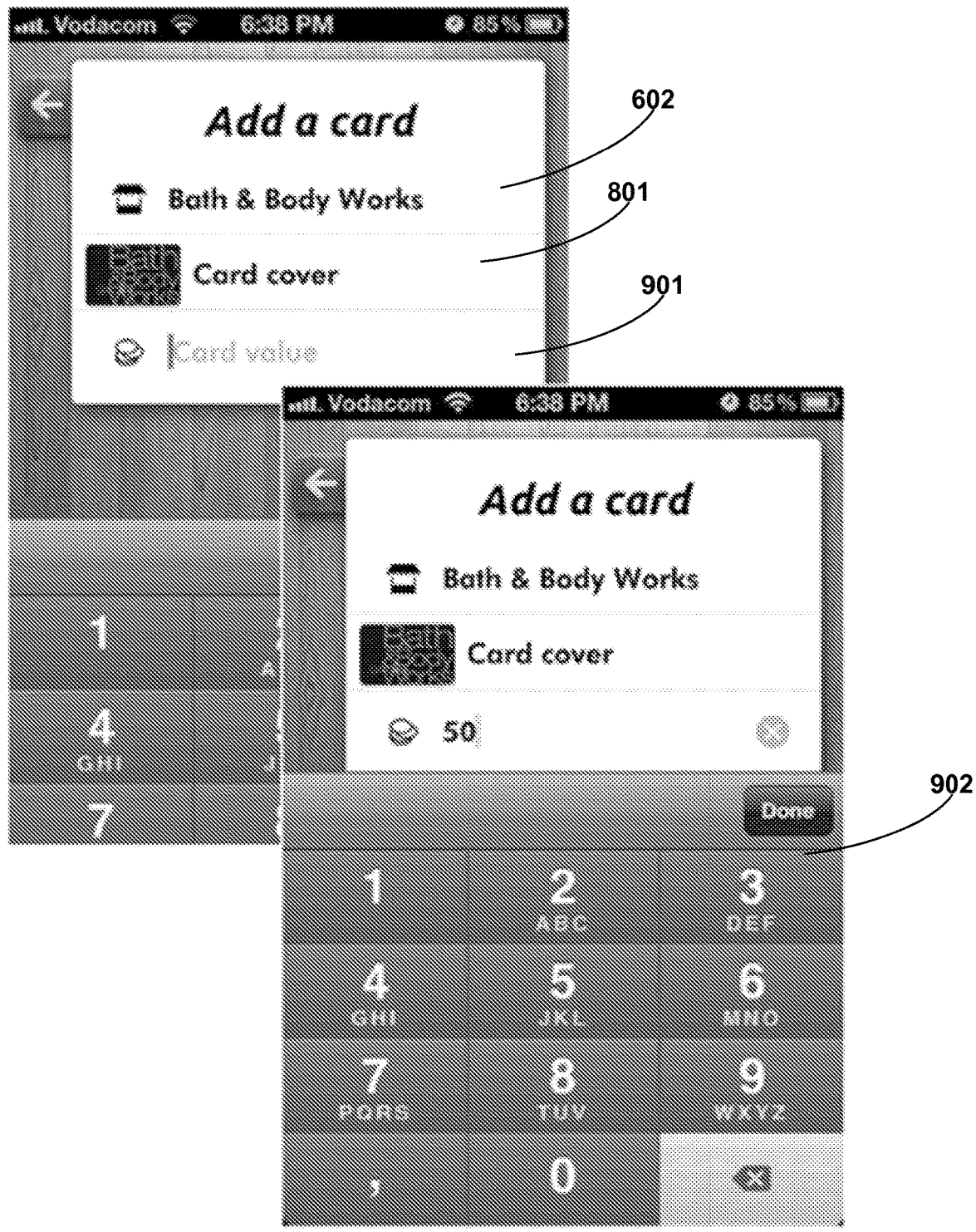
FIG. 9 is a screenshot of a "Selecting a Card Value" screen presented to a user of the accordion interface in certain embodiments.

At step 504, the system may present the user with a "Selecting a Card Value" screen as depicted in FIG. 9. Continuing in accordance with the accordion functionality, the "card cover" field 801 may be populated with the user's selection and a new "card value" field 901 presented. Selecting the "card value" field 901 may allow the user to enter an amount using the entry system 902.

Figure 10:
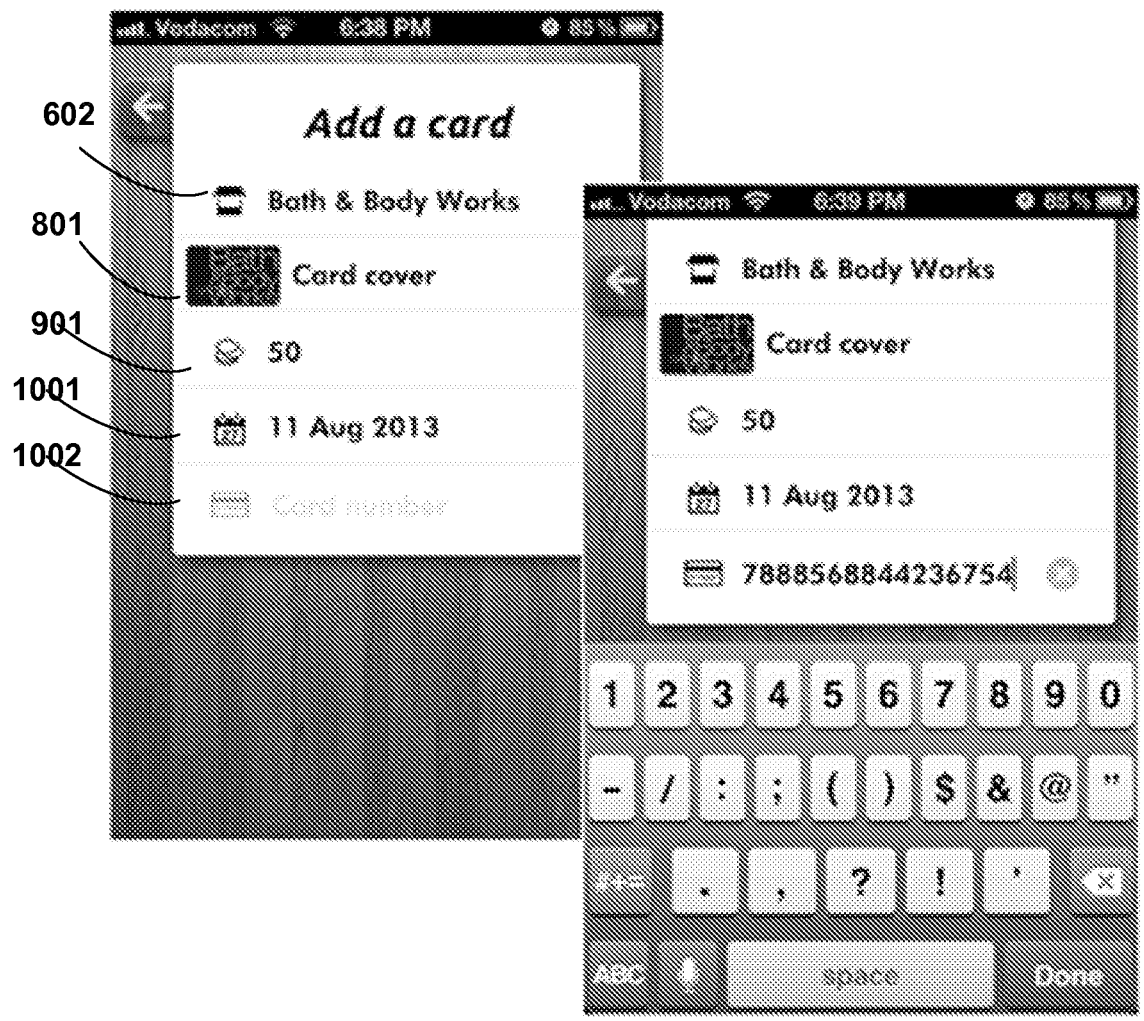
FIG. 10 is a screenshot of a "Capturing Card Number" screen presented to a user of the accordion interface in certain embodiments.

At step 505, the system may present the user with a "Capturing a Card Number" screen as depicted in FIG. 10. Although, for purposes of explanation, only a handful of field entry steps are discussed with respect to FIG. 5, one will readily understand that additional fields may be placed at intervening steps and an unlimited number of accordion stages may be used to populate an unlimited number of corresponding field entries. For example, a "date entry field" 1001 may be provided for the user to select a delivery date for the card. Credit card or other payment information may be entered by selecting the billing entry 1002.

Figure 11:
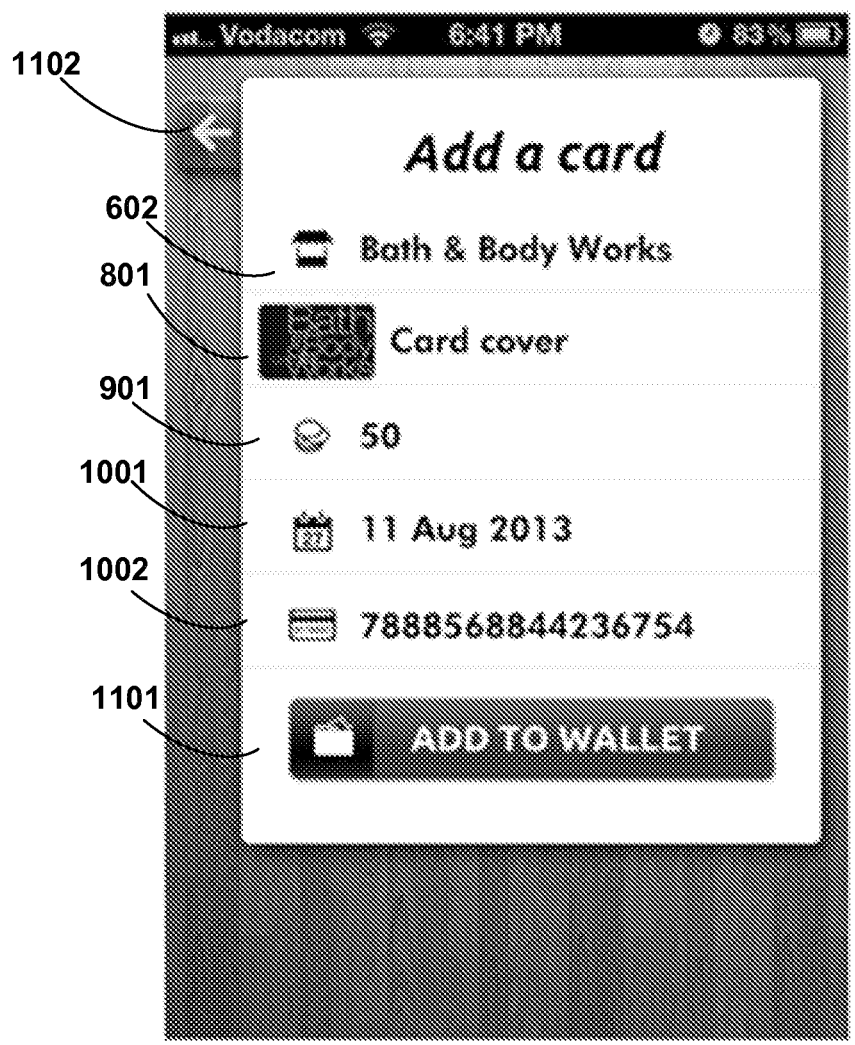
FIG. 11 is a screen shot of a "Finishing Off" screen presented to a user of the accordion interface in certain embodiments.

At step 506, the system may present the user with a "Finishing Off" screen as depicted in FIG. 11. In this example, a final "Add to Wallet" field 1101 slides down from beneath the preceding entry. Selection of the "Add to Wallet" field 1101 may complete the transaction. In some embodiments the user may cancel the transaction at any time prior to selecting the field 1101 by selecting the return button 1102.

Scratch Card Process

Certain embodiments contemplate a novel scratch card method and system for revealing user codes that may be used to redeem/convert the card. When a merchant does not have a point of sales (POS) system that integrates into their gift card program, certain embodiments may offer them this scratching method as a solution. When it comes time to redeem the gift card, the user may be presented with a screen on their mobile device containing a virtual foil scratch area over the barcode/Gift card number or some other identifiable portion of the virtual card or screen. The foil may be any applicable graphic image. The merchant or shop attendant may then observe the user scratching off the virtual foil. Once the user has scratched off a specific percentage or region of the foil, the barcode/Gift card number may be revealed and the computer server may be notified electronically of its use and will no longer allow that gift card to be displayed or sent to a third party. This may provide a measure of security and can prevent fraud or ambiguity as to whether some or all of the value has been redeemed. The electronic or virtual gift card may therefore include or carry a virtual scratchable removable foil or cover as a security or anti-fraud device and mechanism.

Figure 12:
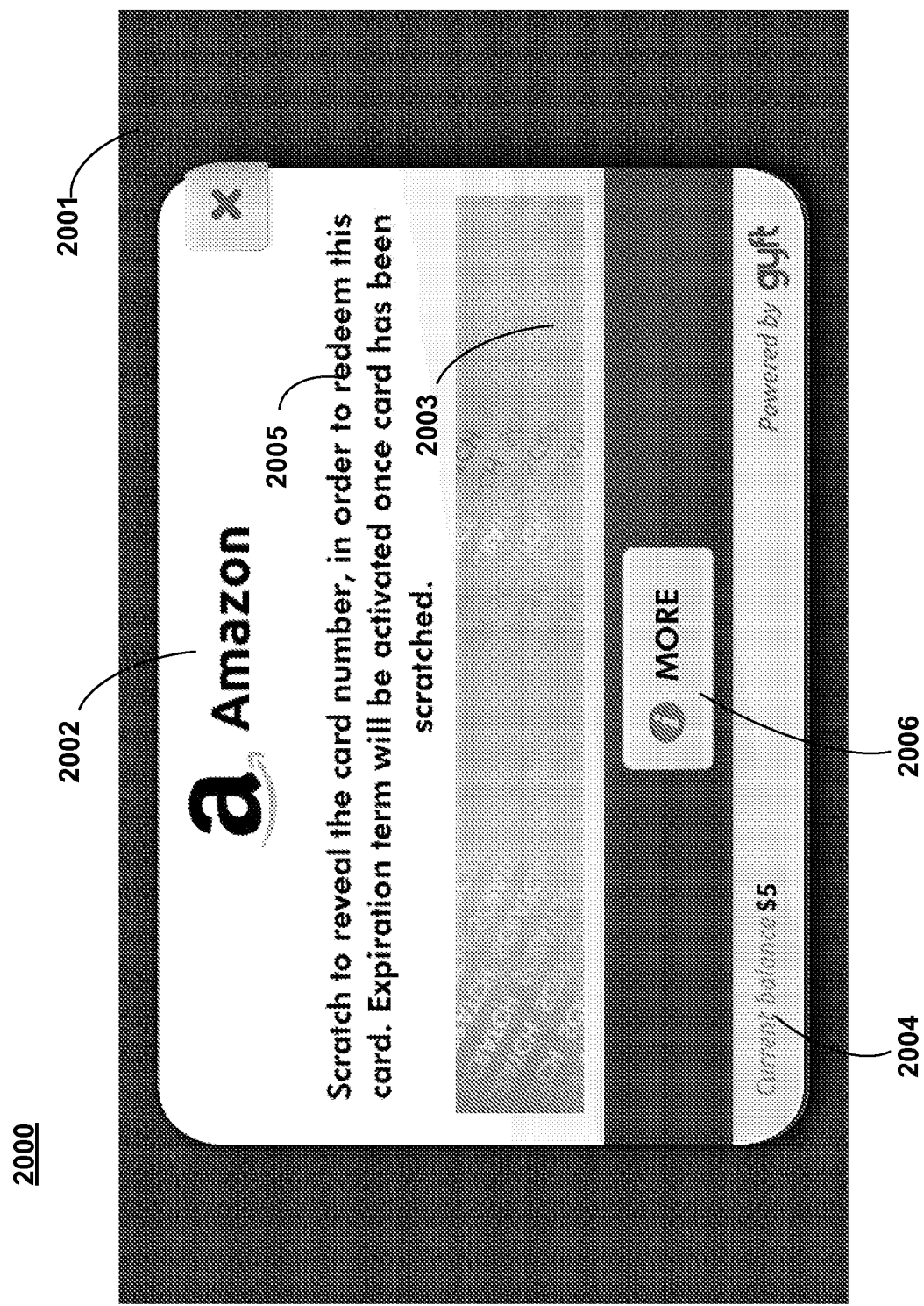
FIG. 12 is a screenshot of a GUI, possibly on a mobile device, such as a mobile phone, for receiving a card scratch input, such as to redeem a gift card in certain embodiments.

FIG. 12 is screenshot of a GUI, possibly on a computer system, such as a mobile device, mobile phone, touchscreen desktop, etc., for receiving a card scratch input, such as to redeem a gift card in certain embodiments. The screen 2001 of the user's system may depict a card 2002 having a text region 2005, a scratchable region 2003, control icons 2006 and a balance indication 2004. The graphic in the scratchable region may be designed to mimic a holographic region, or other physical scratchable areas common to game, lottery, or other gambling cards. Instructions may be provided in text region 2005 for how to redeem the card using the scratching system. A logo of a vendor or merchant may also be provided in the text region 2005 to indicate the correspondence between the card and the merchant.

Figure 13:
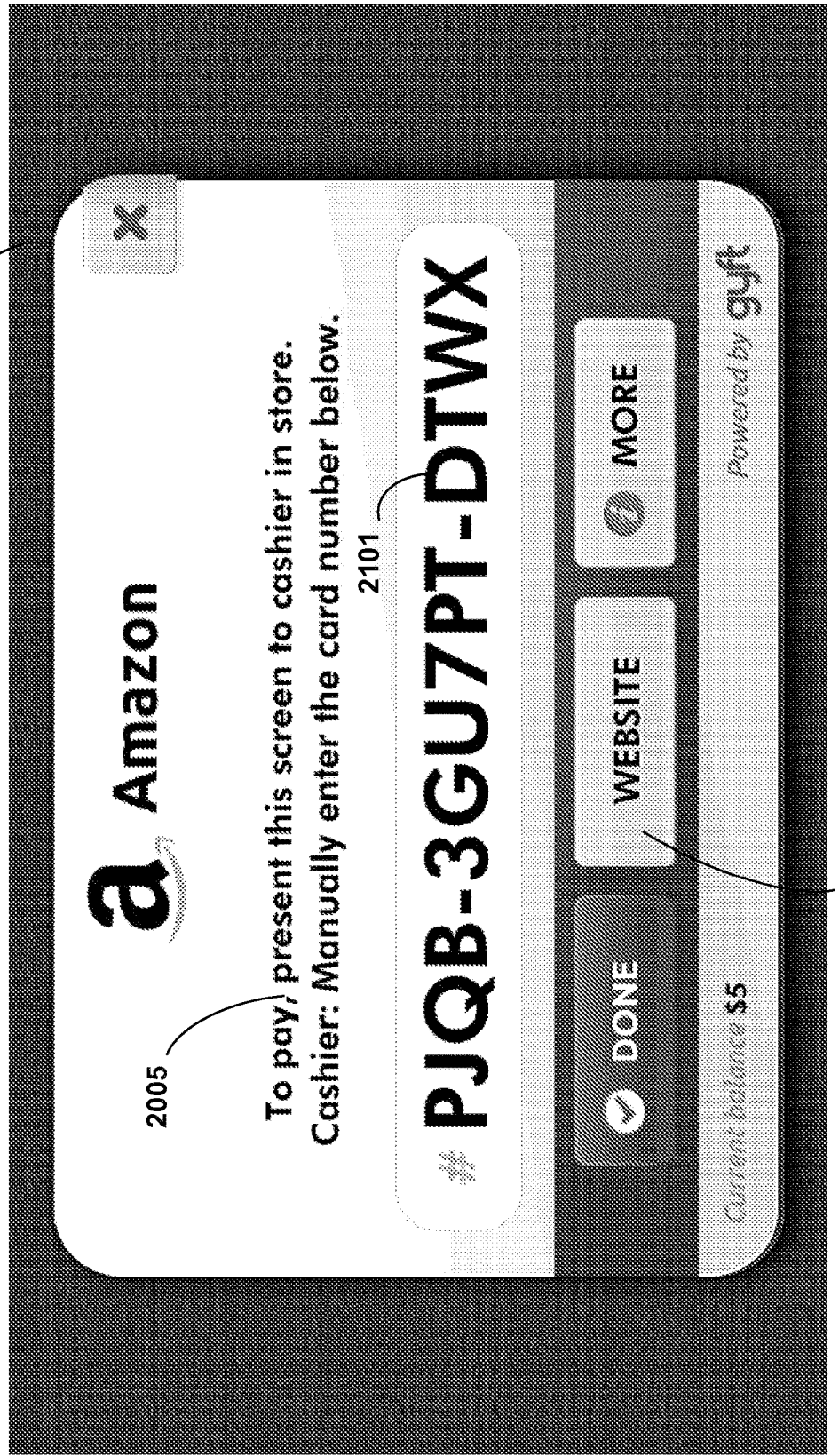
FIG. 13 is a screenshot of a GUI, possibly on a mobile device, such as a mobile phone, following receipt of a scratch input, such as by detecting a finger motion, in certain embodiments.

FIG. 13 is screenshot of a GUI, possibly on a mobile device, such as a mobile phone, following receipt of a scratch input, such as by detecting a finger motion, in certain embodiments. Once a portion, or all, of the graphic in scratchable region 2003 has been removed, e.g., in response to the user's finger swipes, the text in text region 2005 may change and may provide instructions regarding how to use the revealed code to redeem the card. Icons 2006 may also change, e.g., to indicate whether the entire code has been revealed, or to provide links to the merchant's website or other related redemption information. In the example of FIG. 13, removal of the scratchable covering material image has revealed an alphanumeric code 2101. In some embodiments a bar code, QR code, or another code may be displayed.

Computer System Overview

Figure 14:
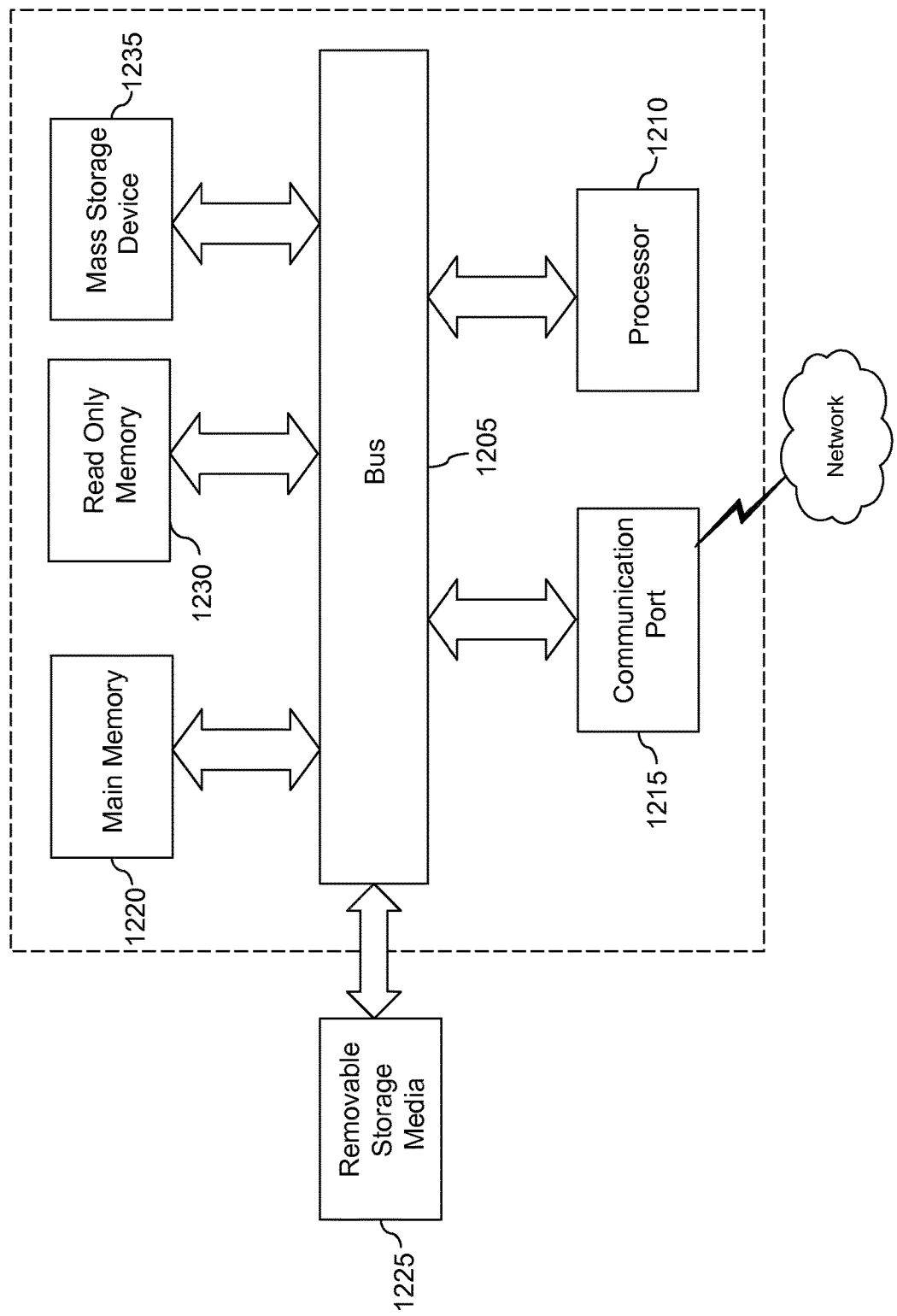
FIG. 14 is a block diagram of components in a computer system which may be used to implement certain of the disclosed embodiments.

Various embodiments include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is an example of a computer system 1200 with which various embodiments may be utilized. Various of the disclosed features may be located on computer system 1200. According to the present example, the computer system includes a bus 1205, at least one processor 1210, at least one communication port 1215, a main memory 1220, a removable storage media 1225, a read only memory 1230, and a mass storage device 1235.

Processor(s) 1210 can be any known processor, such as, but not limited to, an Intel® Itanium® or Itanium 2® processor(s), or AMD® Opteron® or Athlon MP® processor(s), or Motorola® lines of processors. Communication port(s) 1215 can be any of an RS-232 port for use with a modem based dialup connection, a 10/100 Ethernet port, or a Gigabit port using copper or fiber. Communication port(s) 1215 may be chosen depending on a network such as Local Area Network (LAN), Wide Area Network (WAN), or any network to which the computer system 1200 connects.

Main memory 1220 can be Random Access Memory (RAM), or any other dynamic storage device(s) commonly known in the art. Read only memory 1230 can be any static storage device(s) such as Programmable Read Only Memory (PROM) chips for storing static information such as instructions for processor 1210.

Mass storage 1235 can be used to store information and instructions. For example, hard disks such as the Adaptec® family of SCSI drives, an optical disc, an array of disks such as RAID, such as the Adaptec family of RAID drives, or any other mass storage devices may be used.

Bus 1205 communicatively couples processor(s) 1210 with the other memory, storage and communication blocks. Bus 1205 can be a PCI/PCI-X or SCSI based system bus depending on the storage devices used.

Removable storage media 1225 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations. Therefore, the above description should not be taken as limiting the scope of the invention.

Remarks

While the computer-readable medium is shown in an embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In general, the routines executed to implement the embodiments of the disclosure, may be implemented as part of an operating system or a specific application, component, program, object, module or sequence of instructions referred to as "programs," The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teaching of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method for presenting a selection of stored value cards, wherein the stored value cards comprise digital stored value cards for use in connection with a mobile device, and wherein the method further comprises:
    receiving, by a stored value card selection system, an identification of an intended recipient of a stored value card, and further receiving a first information comprising at least one recipient attribute associated with the intended recipient of the stored value card, the at least one recipient attribute including a location information associated with the intended recipient;
    receiving, by the stored value card selection system, a second information comprising a second recipient attribute based on at least one trend identified from analyzing stored value card redemptions by other recipients sharing at least one demographic attribute with the intended recipient, location attribute, with the intended recipient, or action taken previously by the intended recipient;
    receiving, by the stored value card selection system, a third information comprising at least one stored value card attribute associated with a merchant, the at least one stored value card attribute including at least one or more locations at which the merchant offers to redeem the stored value card or where the merchant offers to ship a good or service to;
    determining, by the stored value card selection system, a plurality of stored value cards based on the intended recipient, the first information, and the second information;
    ranking, by the stored value card selection system, in a list, the plurality of stored value cards based on the intended recipient, and the first information, and the second information;
    presenting, by the stored value card selection system, the plurality of stored value cards based on the ranking, the first information, and the second information;
    receiving, by the stored value card selection system, a request for purchase of at least one selected stored value card from the plurality of stored value cards;
    receiving, by the stored value card selection system, a selection of a card cover for the at least one selected stored value card;
    transmitting, by the stored value card selection system, a uniquely identified electronic token to the intended recipient based on the at least one selected stored value card, wherein the uniquely identified electronic token comprises a code; and
    wherein the code is used for redemption of the at least one selected stored value card with at least one merchant based on the third information.

2. The method of claim 1, wherein determining the plurality of stored value cards further comprises: determining weights associated with the at least one stored value card attributes, and determining a ranking index measure associated with the plurality of stored value cards based at least in part on the weights.

3. The method of claim 2, wherein the one or more stored value card attributes comprises a correspondence between merchandise associated with the stored value card and wherein the at least one recipient attribute comprises a preference of the intended recipient.

4. The method of claim 2, wherein the one or more stored value card attributes includes trending information associated with at least one merchant merchandise or a service, the merchandise or the service associated with the stored value card.

5. The method of claim 1, wherein, determining the plurality of stored value cards based on the intended recipient, the first information, and the second information further comprises selecting the plurality of stored value cards based on the at least one trend.

6. The method of claim 5, wherein the at least one trend comprises stored value card redemption data associated with at least one merchant merchandise.

7. The method of claim 5, wherein the ranking the plurality of stored value cards based on the intended recipient, the first information, and the second information further comprises ranking the list of plurality of stored value cards based on the at least one trend.

* * * * *